(12) United States Patent
Anusbigian

(10) Patent No.: US 9,920,983 B1
(45) Date of Patent: Mar. 20, 2018

(54) QUICK-CHILL BEVERAGE CHILLER HAVING MULTIPLE RESERVOIRS

(71) Applicant: HYPERBIUS, INC., West Palm Beach, FL (US)

(72) Inventor: Nick Anusbigian, West Palm Beach, FL (US)

(73) Assignee: HYPERBIUS, INC., West Palm Beach, FL (US)

( * ) Notice: Subject to any disclaimer, the term of this patent is extended or adjusted under 35 U.S.C. 154(b) by 53 days.

(21) Appl. No.: 14/789,818

(22) Filed: Jul. 1, 2015

Related U.S. Application Data

(60) Provisional application No. 62/113,886, filed on Feb. 9, 2015.

(51) Int. Cl.
*F25D 3/08* (2006.01)
*F25D 31/00* (2006.01)
*B23P 15/26* (2006.01)

(52) U.S. Cl.
CPC ............ *F25D 31/002* (2013.01); *B23P 15/26* (2013.01)

(58) Field of Classification Search
CPC ............ F25D 31/002; F25D 2331/803; F25D 2303/0831
See application file for complete search history.

(56) References Cited

U.S. PATENT DOCUMENTS

| | | | | |
|---|---|---|---|---|
| 2,657,837 A | * | 11/1953 | Bernhardt | B65D 47/286 222/561 |
| 3,810,557 A | * | 5/1974 | Cline | A47G 19/2288 215/12.1 |
| 5,361,604 A | * | 11/1994 | Pier | B65D 81/3883 62/371 |
| 5,520,014 A | * | 5/1996 | Laugier | A23G 9/08 62/457.2 |
| 5,653,362 A | * | 8/1997 | Patel | A47J 41/0011 222/156 |
| 2006/0016212 A1 | | 1/2006 | Roth et al. | |
| 2006/0163263 A1 | * | 7/2006 | Helline | F25D 3/08 220/592.18 |
| 2006/0231559 A1 | | 10/2006 | Allen | |

FOREIGN PATENT DOCUMENTS

JP S50 42355 U 4/1975
WO WO 94/07096 A1 3/1994

OTHER PUBLICATIONS

EP Search Report, dated Sep. 6, 2016.

* cited by examiner

*Primary Examiner* — Elizabeth Martin
(74) *Attorney, Agent, or Firm* — Steven M. Greenberg, Esq.; CRGO Law

(57) ABSTRACT

A beverage chiller comprising a first cylinder and a second cylinder sized and arranged with the second cylinder disposed within the first cylinder to define a first reservoir between the first cylinder and the second cylinder for receiving a beverage to be chilled. The second cylinder defines an internal chamber for receiving a chilling medium. A cup fabricated from an insulative material receives the cylinders therein with the first cylinder and cup defining a second reservoir for receiving a chilling medium. The first and second cylinders are fabricated from a material having substantial thermal conductivity.

16 Claims, 8 Drawing Sheets

US 9,920,983 B1

QUICK-CHILL BEVERAGE CHILLER HAVING MULTIPLE RESERVOIRS

CROSS-REFERENCE TO RELATED APPLICATION(S)

This application claims priority under 35 U.S.C. § 119 to U.S. Provisional Patent Application Ser. No. 62/113,886 filed Feb. 9, 2015.

BACKGROUND

The present disclosure relates generally to cooling hot beverages, and more particularly, to an assembly for rapidly cooling a hot beverage.

Insulating containers for keeping beverages warm are well known. Conversely, portable devices for chilling warm beverages are also known. However, these typically are deficient when it comes to rapidly cooling a hot beverage.

Accordingly, it would be advantageous to provide a novel assembly that facilitates rapid cooling of hot beverages, is portable, and easy to use and clean.

SUMMARY

In accordance with an aspect of the disclosure, a beverage chiller is disclosed herein. The beverage chiller generally includes a first cylinder including a sidewall defined by an inner surface and an outer surface. A second cylinder including a sidewall defined by an inner surface and an outer surface is configured with a diameter less than a diameter of the first cylinder so as to fit within the first cylinder with the inner surface of the first cylinder confronting the outer surface of the second cylinder to define a first reservoir between the first cylinder and the second cylinder for receiving a beverage to be chilled. The second cylinder further defines a chamber for receiving a chilling medium. A cup is provided to enclose the first and second cylinders. The cup includes a sidewall having an inner surface and an outer surface, and the first cylinder is disposed within the cup with the outer surface of the first cylinder confronting the inner surface of the cup to define a second reservoir for receiving a chilling medium.

In accordance with another aspect, there is provided a method of fabricating a beverage chiller.

In accordance with these and additional aspects that will become apparent hereinafter, the present disclosure will now be described with particular reference to the accompanying drawings.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
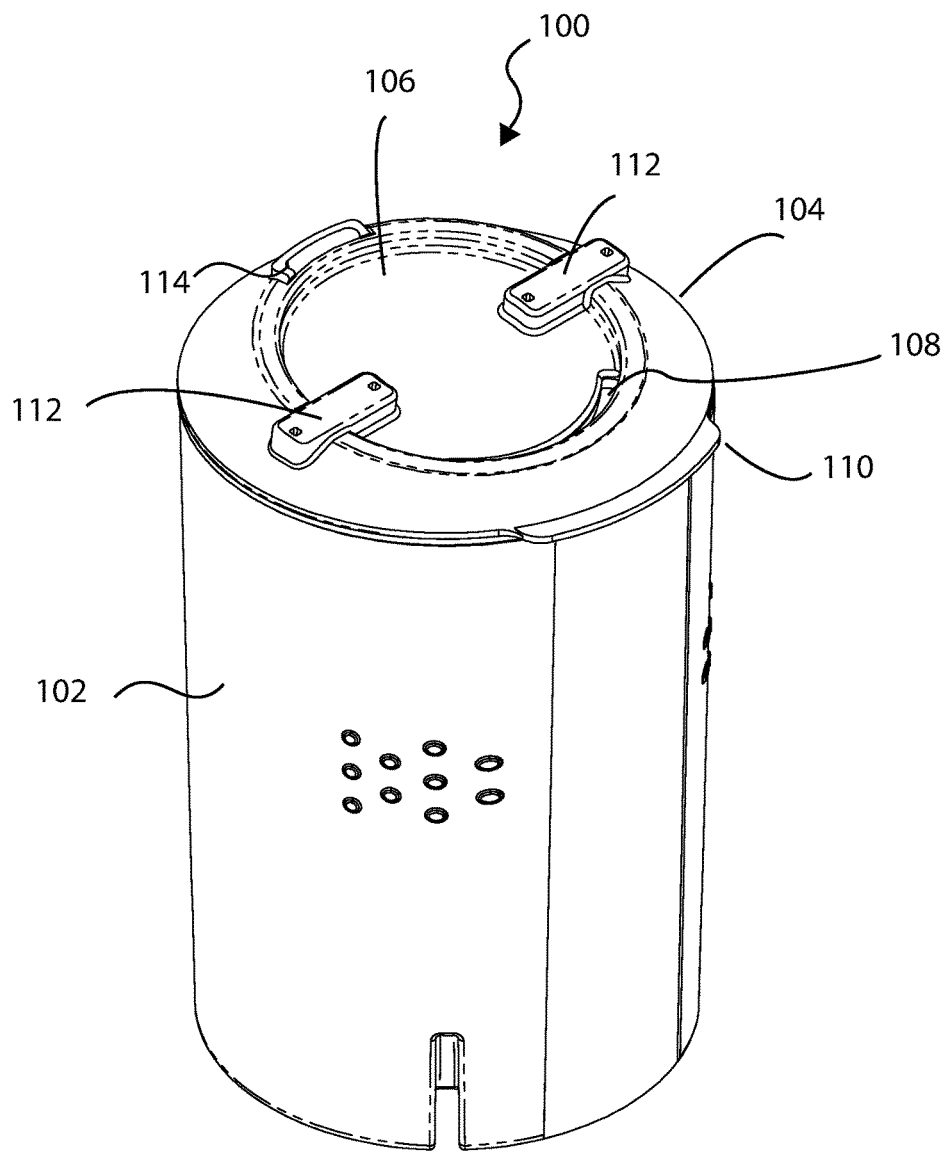
FIG. 1 is an isometric view of a beverage chiller in accordance with aspects of the disclosure.

Specific embodiments of the disclosure will now be described in detail with reference to the accompanying figures. For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

In the following detailed description of embodiments of the disclosure, numerous specific details are set forth in order to provide a more through understanding of the disclosure. However, it will be apparent to those skilled in the art that the disclosure may be practiced without these specific details. In other instances, well-known features have not been described in detail to avoid unnecessarily complicating the description.

Referring to FIG. 1, there is depicted an isometric view of an exemplary beverage chiller assembly 100 in accordance with aspects of the disclosure. Beverage chiller 100 includes a cup 102, and snap-on lid/top ("lid") 104. Lid 104 includes a sloped top surface 106 that enables a beverage to be chilled to flow into an input port 108 extending through lid 104 and fluidly communicating with an interior reservoir of the beverage chiller 100 as described in further detail below. Lid 104 may be provided with a lip 110 to facilitate ease of insertion into cup 102. A pair of diametrically opposed raised shoulders may be incorporated into the top of the lid to assist in grasping lid 104 when inserting and removing the lid from cup 102. Finally, an output port 114 is disposed at a top surface of the lip 110.

Figure 2:
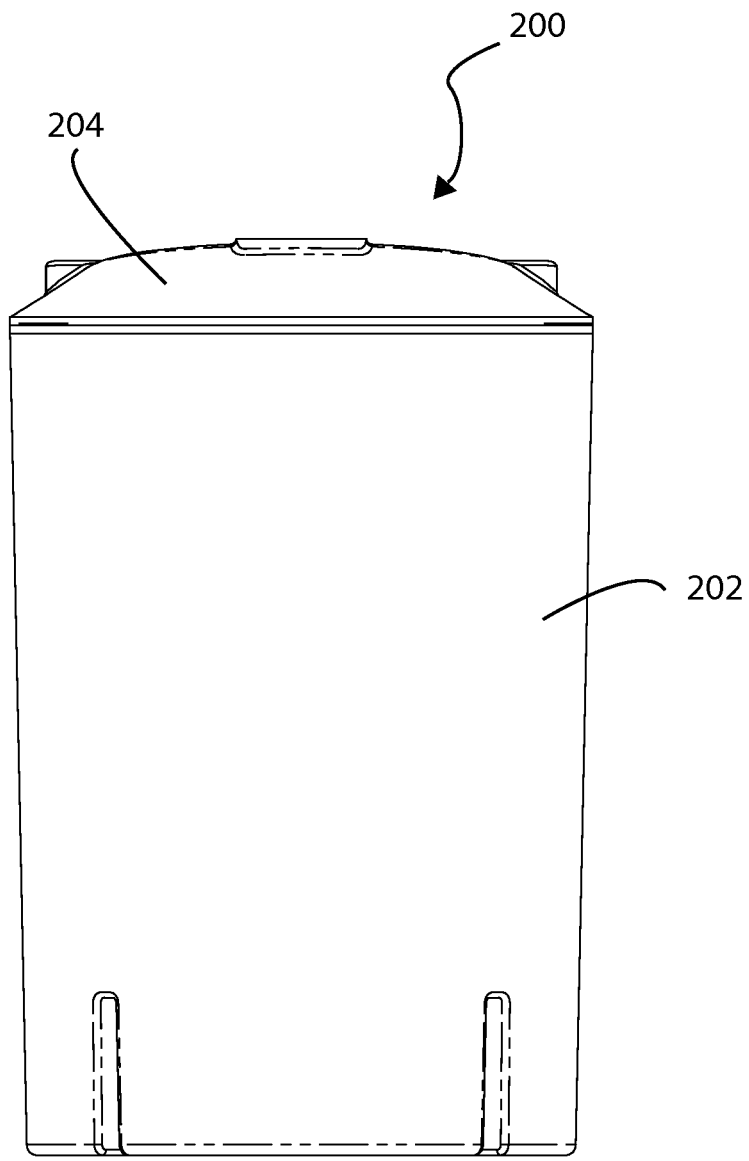
FIG. 2 is a first side elevation view thereof.

Referring to FIG. 2, there is depicted a first side elevation view of the beverage chiller 200 including the cup 202 and lid 204.

Figure 3:
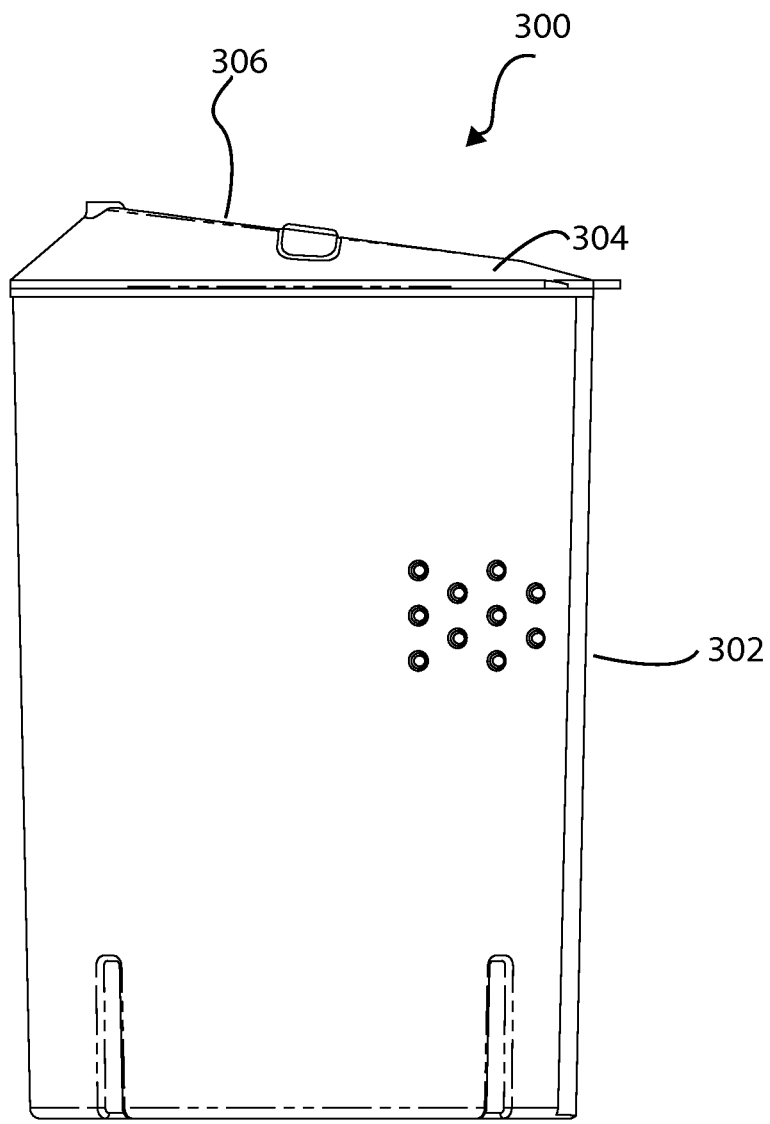
FIG. 3 is a second side elevation view thereof.

Referring to FIG. 3, there is depicted a second side elevation view of the beverage chiller 300 showing the cup 302 and the sloped top surface 306 of lid 304.

Figure 4:
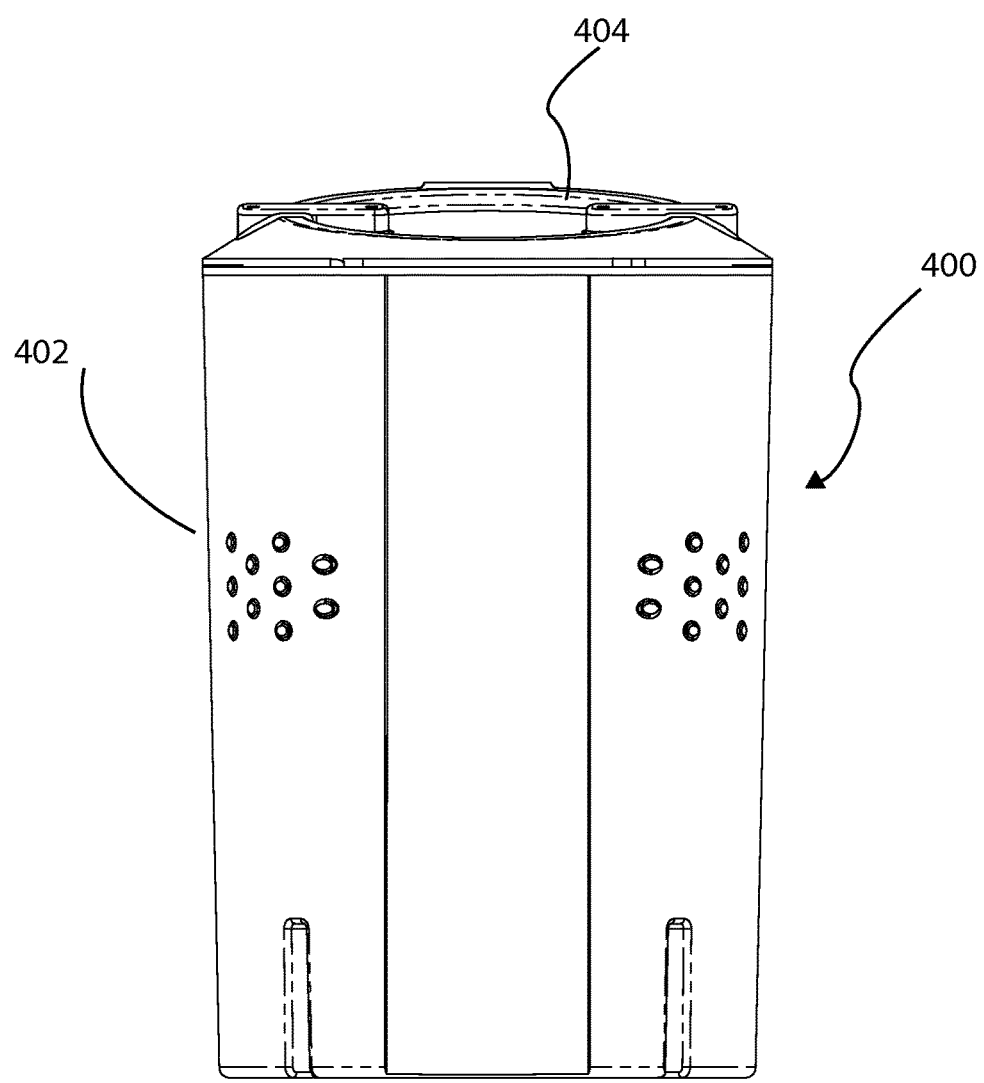
FIG. 4 is a third side elevation view thereof.

Referring to FIG. 4, there is shown a third side elevation view of the beverage chiller 400 comprising cup 402 and lid 404.

Figure 5:
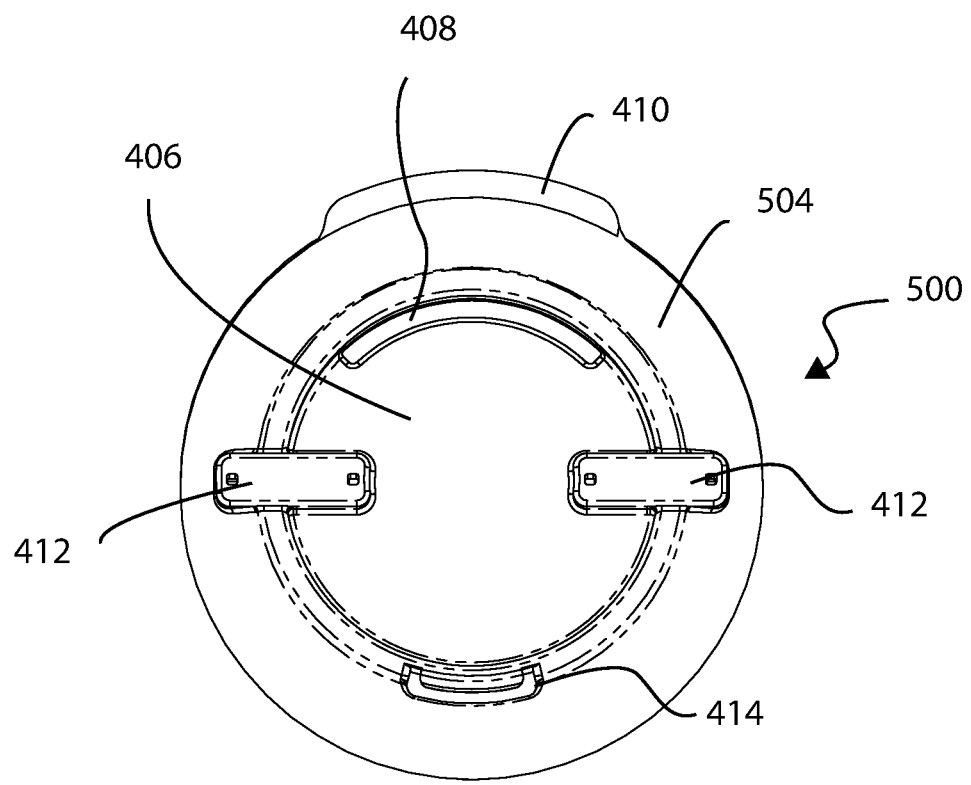
FIG. 5 is top plan view thereof.

Referring to FIG. 5, there is illustrated a top plan view of the beverage chiller 500 and the lid 504 in greater detail. Lid 504 comprises the sloped surface 406 to feed the beverage to input port 408. Diametrically opposed shoulders 412 extend from the top, and lip 410 preferably extends beyond the periphery of the top to facilitate grasping the lid. Output port 414 is disposed at a top surface of the lip 410.

Figure 6:
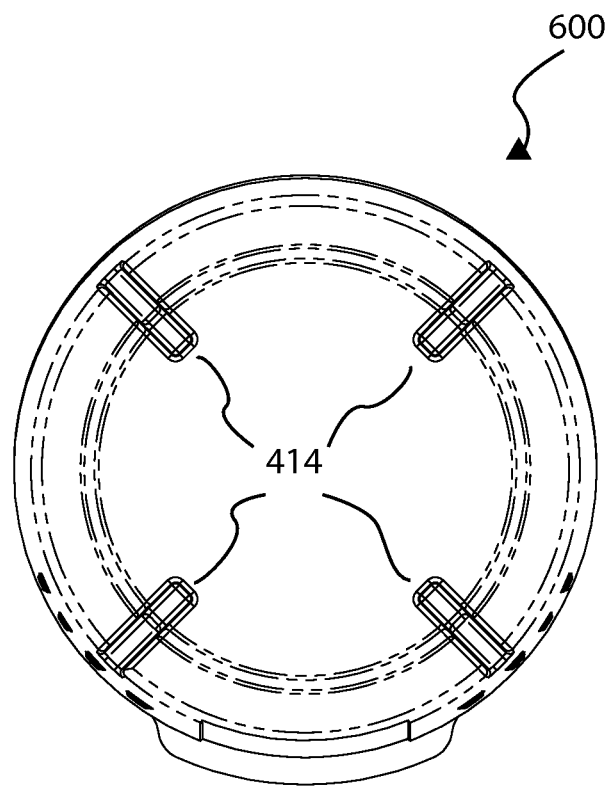
FIG. 6 is a bottom plan view thereof.

FIG. 6 is a bottom plan view of the beverage chiller 600 showing four diametrically opposed supports 414 in phantom that support the inner assembly of the chiller as described in more detail below.

Figure 7:
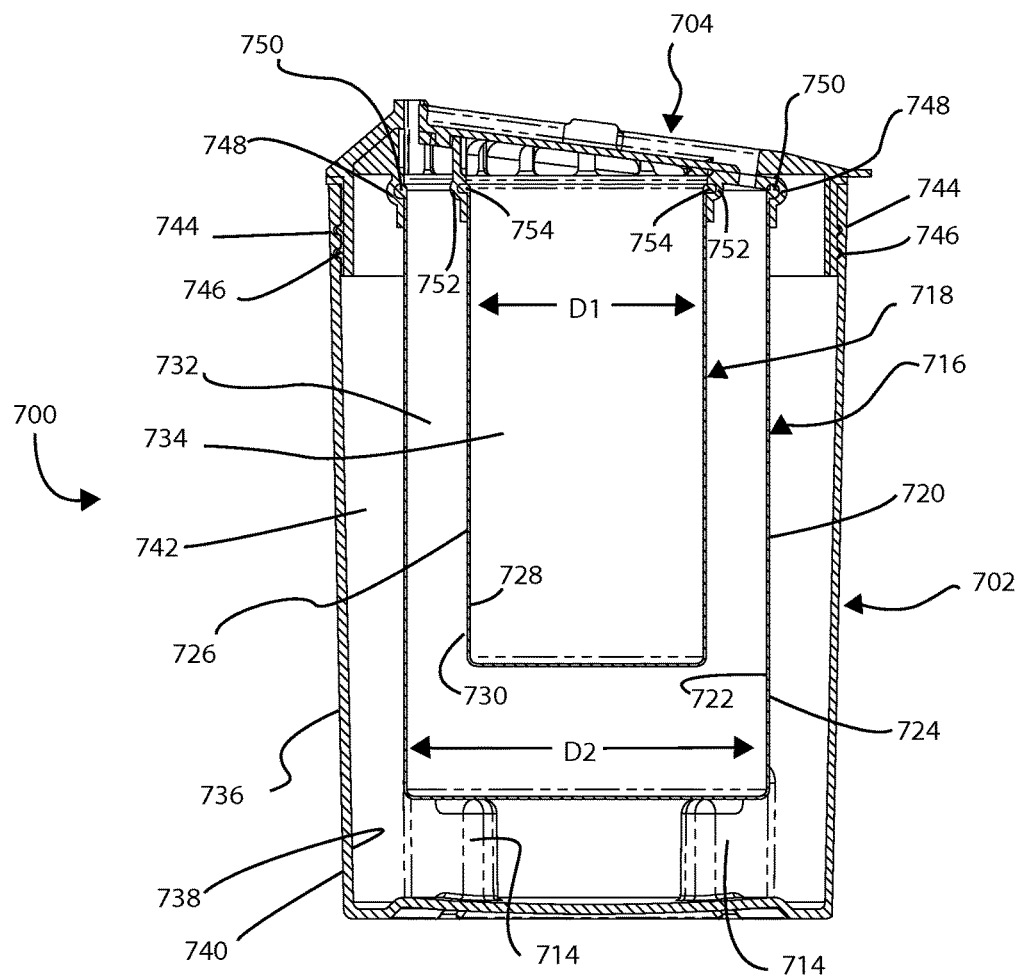
FIG. 7 is a sectional view thereof.
Figure 8:
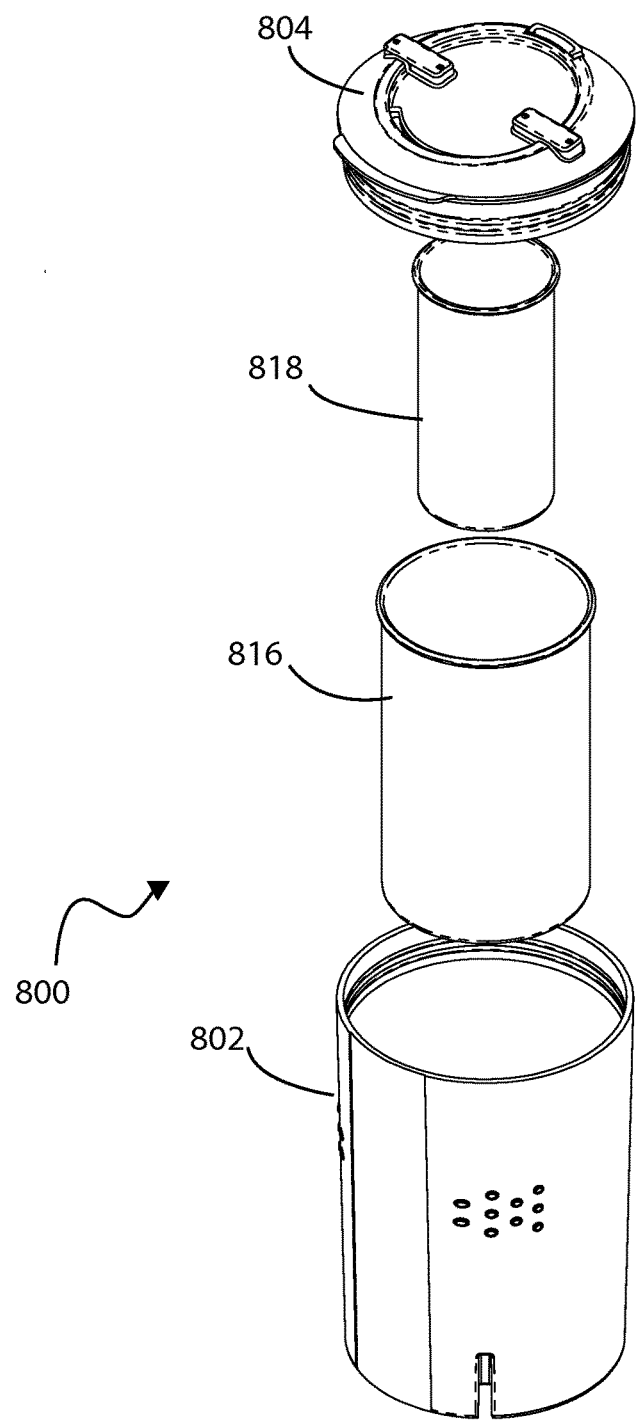
FIG. 8 is an exploded isometric view thereof.

FIG. 7 is a sectional view and FIG. 8 is an exploded view of the chiller assembly 700/800 showing details of the individual components and method of operation. Specifically, chiller assembly 700/800 includes cup 702/802 and lid 704/804 as shown and described above. Advantageously, chiller assembly 700/800 further includes a first cylinder 716/816 and a second cylinder 718/818. The cylinders 716, 718 are preferably fabricated from a material with a relatively high conductive heat transfer coefficient including but not limited to stainless steel. It will be appreciated by those skilled in the art that any such material having a high coefficient of conductive heat transfer can be utilized. First cylinder 716 includes a sidewall 720 defined by an inner surface 722 and an outer surface 724. The second cylinder 718 includes a sidewall 726 defined by an inner surface 728 and an outer surface 730. The second cylinder 718 is configured with a diameter D1 less than a diameter D2 of the first cylinder 716 and disposed within the first cylinder 716 with the inner surface 722 of the first cylinder confronting the outer surface 730 of the second cylinder 718 to define a first reservoir 732 between the first cylinder 716 and the second cylinder 718 for receiving a beverage to be chilled. The second cylinder provides a chamber 734 for receiving a chilling medium that cools the beverage in reservoir 732 through the sidewall 726 of the second cylinder 718. The cup 702 includes a sidewall 736 having an inner surface 738 and an outer surface 740. The first cylinder 716 positioned within the cup 702 with the outer surface 724 of the first cylinder 716 confronting the inner surface 738 of the cup 702 to define a second reservoir 742 for receiving a chilling medium to chill the beverage within reservoir 732 by thermal conduction through sidewall 720 of the first cylinder 716. In this manner, the beverage in reservoir 732 is chilled from both sides and via an increased surface area of the highly thermally conductive cylinders. This advantageously provides for a reduced chilling time compared to known beverage chillers.

Still referring to FIG. 7, cup 702 is fabricated with a plurality of circumferential indentations 744 configured to receive corresponding circumferential protrusions 746 formed in lid 704 in a threaded fit so that the lid 702 can be screwed into the cup 704. The first cylinder 716 and second cylinder 718 are provided with circumferential protrusions configured to enable a snap fit with corresponding channels formed in the lid 702. Specifically, lid 702 includes circumferential channel 748 that snap-fits over a corresponding protrusion 750 in first cylinder 716. Lid 702 further includes a circumferential channel 754 that snap- fits over corresponding protrusion 752 in the second cylinder 718. As can be seen, the cylinder subassembly comprising the first and second cylinders 716, 718 are supported by a plurality of radial supports 714 proximally disposed at the bottom of cup 702.

In operation, a user places a chilling medium such as for example, water to be frozen, in the chamber of the first cylinder and the chilling medium into the second reservoir defined by the outside of the first cylinder and the confronting inner wall of the cup. The lid is snap-fit over the cylinder assembly, and threaded into the cup to provide a chiller assembly having a first reservoir that fluidly communicates with the port to receive a hot/warm beverage to be chilled via heat transfer through the walls of the first and second cylinders. Once chilled, the beverage is simply dispensed through the same port.

The drawings and the description above relate to various embodiments by way of illustration only. It is noted that wherever practicable similar or like reference numbers may be used in the drawings and may indicate similar or like functionality. The drawings depict embodiments of the disclosed system (or method) for purposes of illustration only. One skilled in the art will readily recognize from the following description that alternative embodiments of the structures and methods illustrated and described herein may be employed without departing from the principles described herein.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct physical or electrical contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article or apparatus that comprises a list of elements is not necessarily limited to only those elements but may include other elements not expressly listed or inherent to such process, method, article or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the system. This description should be read to include one or at least one and the singular also includes the plural unless it is obvious that it is meant otherwise.

Upon reading this disclosure, those of skill in the art will appreciate still additional alternative structural and functional designs for a beverage chiller through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

I claim:

1. A beverage chiller comprising:
a first cylinder including a sidewall defined by an inner surface and an outer surface;
a second cylinder including a sidewall defined by an inner surface and an outer surface, the second cylinder having a diameter less than a diameter of the first cylinder and removably disposed within the first cylinder with the inner surface of the first cylinder confronting the outer surface of the second cylinder to define a first reservoir between the first cylinder and the second cylinder for receiving a beverage to be chilled, the second cylinder further defining a chamber for receiving a chilling medium;
a cup including a sidewall, the sidewall having an inner surface and an outer surface, the first cylinder disposed within the cup with the outer surface of the first cylinder confronting the inner surface of the cup to define a second reservoir for receiving the chilling medium; and, a lid secured to the cup and securing the first and second cylinders within the cup, the lid further comprising an elliptical lip enclosing a recessed sloping surface directing the beverage to be chilled to an input port fluidly communicating with the first reservoir at a circumferential channel disposed where an interior portion of the lip meets a bottom-most portion of the sloping surface, the elliptical lip further comprising an output port disposed at a top surface of the elliptical lip dispensing the beverage from the first reservoir after chilling.

2. The beverage chiller recited in claim 1, wherein the first cylinder and second cylinder are fabricated from a material with substantially high thermal conductivity.

3. The beverage chiller recited in claim 2, wherein the material is stainless steel.

4. The beverage chiller recited in claim 3, wherein the cup is fabricated from an insulative material.

5. The beverage chiller recited in claim 1, wherein the lid snap fits into the cup and over at least a portion of the first cylinder.

6. The beverage chiller recited in claim 1, wherein the lid is fabricated from an insulative material.

7. The beverage chiller recited in claim 1, further comprising at least one support for supporting a bottom of the first cylinder within the cup.

8. The beverage chiller recited in claim 1, wherein the lid is threadedly secured to a threaded surface at a top portion of the outer surface of the cup securing the first and second cylinders within the cup.

9. A method of fabricating a beverage chiller, comprising:
providing a first cylinder including a sidewall defined by an inner surface and an outer surface;
providing a second cylinder including a sidewall defined by an inner surface and an outer surface, the second cylinder having a diameter less than a diameter of the first cylinder and locating the second cylinder within the first cylinder with the inner surface of the first cylinder confronting the outer surface of the second cylinder to define a first reservoir between the first cylinder and the second cylinder for receiving a beverage to be chilled, the second cylinder further defining a chamber for receiving a chilling medium;
providing a cup including a sidewall, the sidewall having an inner surface and an outer surface, and locating the first cylinder within the cup with the outer surface of the first cylinder confronting the inner surface of the cup to define a second reservoir for receiving the chilling medium; and,
providing a lid secured to the cup and securing the first and second cylinders within the cup, the lid further comprising an elliptical lip enclosing a recessed sloping surface for directing the beverage to be chilled to an input port fluidly communicating with the first reservoir at a circumferential channel disposed where an interior portion of the lip meets a bottom-most portion of the sloping surface, the elliptical lip further comprising an output port disposed at a top surface of the elliptical lip dispensing the beverage from the first reservoir after chilling.

10. The method recited in claim 9, wherein the first cylinder and second cylinder are fabricated from a material with substantially high thermal conductivity.

11. The method recited in claim 10, wherein the material is stainless steel.

12. The method recited in claim 11, wherein the cup is fabricated from an insulative material.

13. The method recited in claim 9, further comprising fabricating the lid with at least one circumferential lip to snap-fit the lid into the cup and over at least a portion of the first cylinder.

14. The method recited in claim 9, further comprising fabricating the top from an insulative material.

15. The method recited in claim 9, further comprising molding at least one support for supporting a bottom of the first cylinder within the cup.

16. The beverage chiller recited in claim 9, wherein the lid is threadedly secured to a threaded surface at a top portion of the outer surface of the cup securing the first and second cylinders within the cup.

* * * * *